(12) United States Patent
Sun et al.

(10) Patent No.: US 12,183,054 B2
(45) Date of Patent: Dec. 31, 2024

(54) FEATURE VECTOR GENERATION USING NEURAL NETWORKS

(71) Applicant: Telefonaktiebolaget LM Ericsson (publ), Stockholm (SE)

(72) Inventors: Bin Sun, Luleå (SE); Rafia Inam, Västerås (SE); Yifei Jin, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 397 days.

(21) Appl. No.: 17/770,674

(22) PCT Filed: Oct. 21, 2019

(86) PCT No.: PCT/EP2019/078613
§ 371 (c)(1),
(2) Date: Apr. 21, 2022

(87) PCT Pub. No.: WO2021/078361
PCT Pub. Date: Apr. 29, 2021

(65) Prior Publication Data
US 2022/0366666 A1    Nov. 17, 2022

(51) Int. Cl.
*G06V 10/44* (2022.01)
*G06N 3/045* (2023.01)
(52) U.S. Cl.
CPC ........... *G06V 10/454* (2022.01); *G06N 3/045* (2023.01)
(58) Field of Classification Search
CPC .............................. G06V 10/454; G06N 3/045
See application file for complete search history.

(56) References Cited

U.S. PATENT DOCUMENTS

2012/0284213 A1  11/2012  Lin et al.
2019/0310650 A1  10/2019  Halder

FOREIGN PATENT DOCUMENTS

CN      109993236 A    7/2019
WO      2020180219 A1  9/2020

OTHER PUBLICATIONS

Kalantidis, Yannis, et al., "Cross-dimensional Weighting for Aggregated Deep Convolutional Features", arXiv:1512.04065v2 [cs.CV], 2016, 1-16.
Simeoni, Oriane, et al., "Unsupervised object discovery for instance recognition", arXiv:1709.04725v2 [cs.CV], 2018, 1-10.

*Primary Examiner* — Brian Whipple
(74) *Attorney, Agent, or Firm* — Murphy, Bilak & Homiller, PLLC (57) ABSTRACT

The present invention enables accelerated feature vector crafting with a high level of trustworthiness. Heretofore, a system (10) is set up from a data source verification apparatus (12) for verifying the at least one data source (14-1, . . . , 14-*n*) that generates the new specimen data and a feature vector crafting apparatus (18) for crafting at least one new feature vector from the new specimen data. The feature vector crafting apparatus (18) receiving data after verification of data sources (14-1, . . . , 14-*n*). The feature vector crafting apparatus (18) automatically generates new feature vectors from new data for forwarding there to an artificial intelligence infrastructure (20).

20 Claims, 9 Drawing Sheets

FEATURE VECTOR GENERATION USING NEURAL NETWORKS

FIELD OF INVENTION

The present invention relates to the field of feature generation using neural networks, and in particular to a method of verifying at least one data source that generates new specimen data intended for use in a machine learning infrastructure, a method of crafting at least one new feature vector from new specimen data generated by at least one data source, a method of automatic generation of at least one feature vector for use in a machine learning infrastructure from new specimen data, and related apparatuses.

BACKGROUND ART

Generally, in machine learning a boosted model technique is highly used for predictive data mining where high accuracy is needed. Here, the boosted machine learning model is used to make a so-called base learner more accurate by focusing more on the wrongly-predicted/regressed instances when building the next sub-model. It can be used for both classification and regression problems depending on which base learner is used. Common base learners are logistic regression, classification and regression tree. Clustering is used to compare the new and current existing data and thus to decide which action will be taken.

Further, in actual processes data sources are highly likely to be streaming data sourced where features are changing from time to time. As new features are added and old ones are removed labelling tools must adapt and change.

However, in current machine learning infrastructures data scientists work on fixed data sets and train machine learning models and do predictions on the basis of new data. However, in real life new data comes all the time. Depending on how similar the new and old data is there is a risk that the machine learning model will not be able to automatically add new features and that there is a need for human interaction.

In order to automatically add new features from new data, there is a need to trust the new data. Currently this requires human interaction in the loop. When a new feature is needed, the machine learning model waits for a human to add the new feature which is time consuming.

SUMMARY OF INVENTION

In view the above the object of the present invention is to enable accelerated feature vector crafting with a high level of trustworthiness.

According to a first aspect of the present invention there is provided a method of verifying at least one data source that generates new specimen data intended for use in a machine learning infrastructure. The method according to the first aspect comprises a step of obtaining at least one feature vector representing the new specimen data at a data source verifying apparatus and a step of executing a correlation check between the received at least one feature vector and at least one reference feature vector representing trusted specimen data for determination of a correlation measure. Then follows a step of registering the at least one data source as trusted data source at a subscription management apparatus when the correlation measure is below a first predetermined threshold and the new specimen data is different from the trusted specimen data.

According to a second aspect of the present invention there is provided a data source verifying apparatus in line with the first aspect. The data source verifying apparatus according to the second aspect achieves verification of at least one data source that generates new specimen data intended for use in a machine learning infrastructure. Heretofore, the data source verifying apparatus according to the second aspect comprises an obtaining unit adapted to obtain at least one feature vector representing the new specimen data at the data verification apparatus, a correlation checking unit adapted to execute a correlation check between the received at least one feature vector and at least one reference feature vector representing trusted specimen data for determination of a correlation measure, and a registration unit adapted to register the at least one data source as trusted data source at a subscription management apparatus. Here, the registration unit adapted to register when the correlation measure is below a first predetermined threshold and the new specimen data is different from the trusted specimen data.

According to a third aspect of the present invention there is provided a data source verifying apparatus for verifying at least one data source that generates new specimen data intended for use in a machine learning infrastructure. The data source verifying apparatus comprises processing circuitry and a memory containing instructions executable by the processing circuitry, whereby the data source verifying apparatus is operable to obtain at least one feature vector representing the new specimen data at the data source verification apparatus, execute a correlation check between the received at least one feature vector and at least one reference feature vector representing trusted specimen data for determination of a correlation measure; and to register the at least one data source as trusted data source at a subscription management apparatus when the correlation measure is below a first predetermined threshold and the new specimen data is different from the trusted specimen data.

According to a fourth aspect of the present invention there is provided a method of crafting at least one new feature vector from new specimen data generated by at least one data source. The method according to the third aspect comprises a step of receiving an identification of at least one trusted data source at a feature vector crafting apparatus and a step of acquiring at least one saliency map in relation to new specimen data generated at the at least one trusted data source. Here, the at least one saliency map indicates which part of the new specimen data is to be used for obtaining at least one new feature. Further, the method according to the third aspect comprises a step of crafting the at least one new feature vector from the part of new specimen data identified by the at least one saliency map.

According to a fifth aspect of the present invention there is provided a feature vector crafting apparatus in line with the third aspect. The feature vector crafting apparatus data according to the fourth aspect achieves crafting of at least one new feature vector from new specimen data generated by at least one data source. Heretofore, the feature vector crafting apparatus according to the fourth aspect comprises a receiving unit adapted to receive an identification of at least one trusted data source at a feature vector crafting apparatus and an acquisition unit adapted to acquire at least one saliency map in relation to new specimen data generated at the at least one trusted data source. Here, the at least one saliency map indicates which part of the new specimen data is to be used for obtaining at least one new feature. Further, the feature vector crafting apparatus according to the fourth aspect comprises a crafting unit adapted to craft the at least one new feature vector from the part of new specimen data identified by the at least one saliency map.

According to a sixth aspect of the present invention there is provided a feature vector crafting apparatus for crafting at least one new feature vector from new specimen data generated by at least one data source. The feature vector crafting apparatus comprises processing circuitry and a memory containing instructions executable by the processing circuitry, whereby the feature vector crafting apparatus is operable to receive an identification of at least one trusted data source at a feature vector crafting apparatus, acquire at least one saliency map in relation to new specimen data generated at the at least one trusted data source, wherein the at least one saliency map indicates which part of the new specimen data is to be used for obtaining at least one new feature, and to draft the at least one new feature vector from the part of new specimen data identified by the at least one saliency map.

According to a seventh aspect of the present invention there is provided a method of automatic generation of at least one feature vector for use in a machine learning infrastructure from new specimen data generated by at least one data source comprising verification of at least one data source that generates the new specimen data by using a method according to the first aspect of the present invention and further comprising obtaining at least one new feature vector from the new specimen data generated by the at least one data source by using a method according to the third aspect of the present invention.

According to an eighth aspect of the present invention there is provided a system for automatic generation of at least one feature vector for use in a machine learning infrastructure from new specimen data generated by at least one data source comprising a data source verifying apparatus for verifying the at least one data source that generates the new specimen data according to the second aspect of the present invention and a feature vector crafting apparatus for crafting at least one new feature vector from the new specimen data according to the second aspect of the present invention.

According to a ninth aspect of the present invention there is provided a computer program product comprising a computer readable medium, the computer readable medium having computer readable code embodied therein, the computer readable code being configured such that, on execution by a suitable computer or processor, the computer or processor is caused to perform a method of verifying at least one data source that generates new specimen data intended for use in a machine learning infrastructure according to the first aspect of the present invention.

According to a tenth aspect of the present invention there is provided a computer program product comprising a computer readable medium, the computer readable medium having computer readable code embodied therein, the computer readable code being configured such that, on execution by a suitable computer or processor, the computer or processor is caused to perform a method of crafting at least one new feature vector from new specimen data generated by at least one data source according to the fourth aspect of the present invention.

DESCRIPRION OF DRAWING

In the following preferred embodiments of the present invention will be described with reference to the drawing in which.

DETAILED DESCRIPTION

Generally, the present invention provides a solution to add the new feature vectors to a machine learning model automatically. The proposed solution consists of a first part which is related to data trustworthiness to ensure that data is correct/genuine and to a second part to automatically create new features. The two parts may work together.

Figure 1:
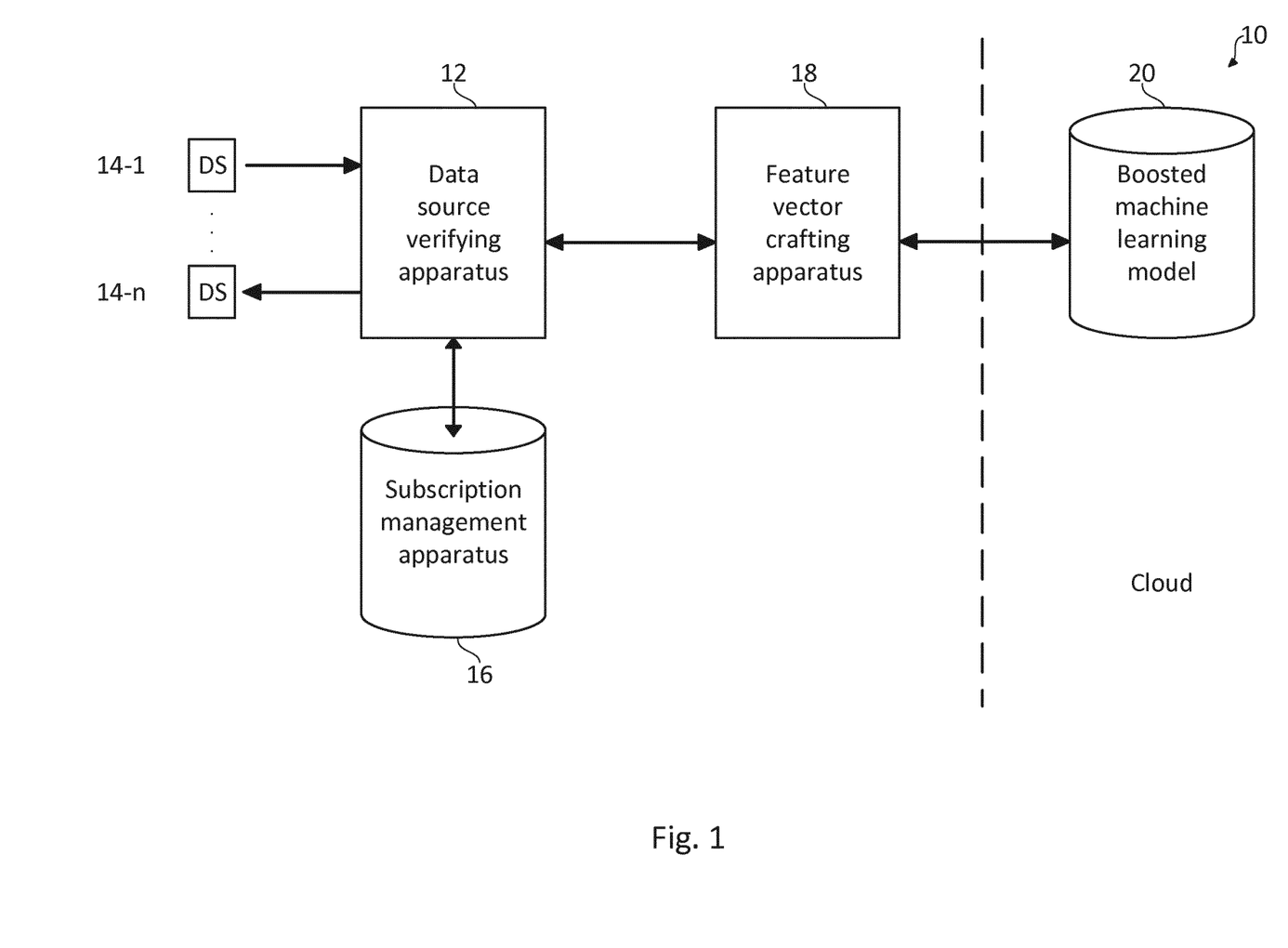
FIG. 1 shows a general outline of application scenario for automatic feature vector generation using neural networks according to the present invention.

FIG. 1 shows a general outline of application scenario for automatic feature vector generation using neural networks according to the present invention.

Generally, integrating verification of at least one data source and crafting at least one new feature vector on a system level provides a system 10 of automatic generation of at least one feature vector for use in a machine learning infrastructure from new specimen data.

As shown in FIG. 1, the system 10 is set up from a data source verification apparatus 12 for verifying the at least one data source 14-1, . . . , 14-n that generates the new specimen data and a feature vector crafting apparatus 16 for crafting at least one new feature vector from the new specimen data.

As shown in FIG. 1, in the system 10 there is operated a subscription management apparatus 16 which interacts with the data source verifying apparatus 12 to maintain a list of trustworthy data sources 14-1, . . . , 14-n.

As shown in FIG. 1, in the system 10 there is also operated a feature vector crafting apparatus 18 receiving after verification of data sources 14-1, . . . , 14-n. The feature vector crafting apparatus 18 automatically generates new feature vectors from new data for forwarding there to an artificial intelligence infrastructure 20 which may be run, e.g., in a cloud environment.

Thus, the present invention advantageously achieves automatic verification, automatic identification of new objects and automatic crafting of new feature vectors aiming at zero-touch automation.

Further, the present invention advantageously removes human in the loop reduces cost and makes the entire procedure much faster.

Still further, the present invention advantageously allows to automatically verify the trustworthiness of data sources, e.g., in a radio network for machine learning model deployed in mobile network or for a port to 3rd party application. Data source verification allows to filter out the untrusted/false data source from subscription information.

Still further, the present invention provides an automated method and apparatus for mining feature areas, for crafting features for training of boosted machine learning models, for classifying newly involved identical objects or predict regression values without labels and/or without human involvement in the labelling process.

Figure 2:
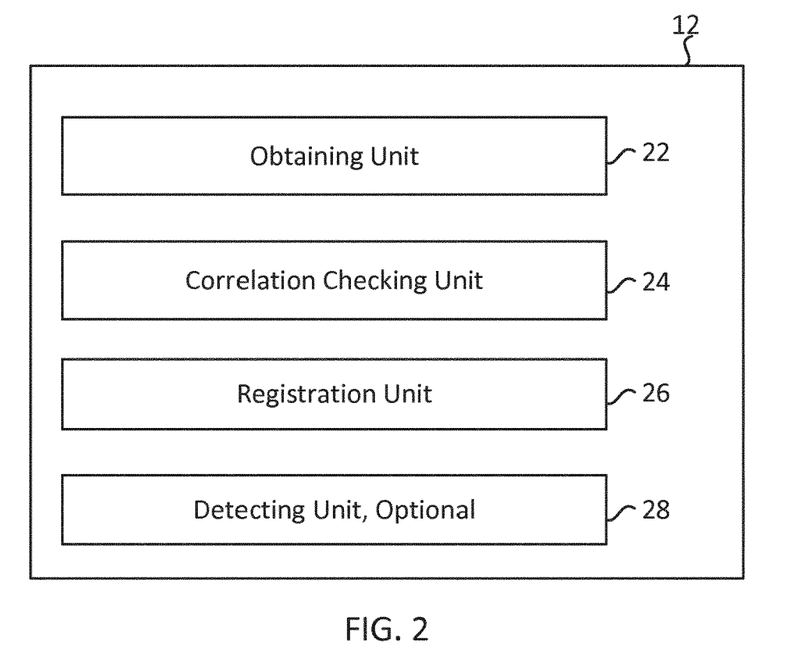
FIG. 2 shows a schematic diagram of a data source verifying apparatus for verifying at least one data source that generates new specimen data according to the present invention.

FIG. 2 shows a schematic diagram of the data source verifying apparatus 12 for verifying at least one data source that generates new specimen data according to the present invention.

The data source verifying apparatus 12 may comprise processing circuitry or processor 48 and a memory 50 containing instructions executable by the processing circuitry 48 to implement the functionality to be described in the following.

Generally, the function of the data source verifying apparatus 12 is to make sure that data is trustworthy and secure for the data pipeline. The reason for this is that data can be wrongly labeled, noise-polluted, or adversary. Another adverse scenario may be an unauthorized access during data transmission from a data source 14-1, . . . , 14-n, e.g. a portable device labeling new data to cloud as computation resource, e.g., through a man in the middle attack.

As shown in FIG. 2, the data source verifying apparatus 12 comprises an obtaining unit 22 adapted to obtain at least one feature vector representing the new specimen data at the data verification apparatus 12.

Preferably, the obtaining unit 22 may be adapted to obtain the at least one feature vector as output of a Siamese network processing input source data.

Further, preferably the obtaining unit 22 may be adapted to compress image data by filter and polling layers of the Siamese network for generation of the input source data.

Further, preferably the obtaining unit 22 may be adapted to obtain at least one feature vector which is encrypted and/or compressed.

As shown in FIG. 2, the data source verifying apparatus 12 further comprises a correlation checking unit 24 adapted to execute a correlation check between the received at least one feature vector and at least one reference feature vector representing trusted specimen data for determination of a correlation measure.

Preferably, the correlation checking unit 24 is adapted to execute a similarity/distance check.

As shown in FIG. 2, the data source verifying apparatus 12 further comprises a registration unit 26 adapted to register the at least one data source as trusted data source at the subscription management apparatus 16 when the correlation measure is below a first predetermined threshold and the new specimen data is different from the trusted specimen data.

As shown in FIG. 2, the data source verifying apparatus 12 comprises a detaching unit 28 adapted to detach the at least one data source 14-1, . . . , 14-n from the data source verifying apparatus 12 when the correlation measure is equal to or higher than the predetermined threshold. It should be noted that the provision of the detaching unit 28 is optional.

Figure 3:
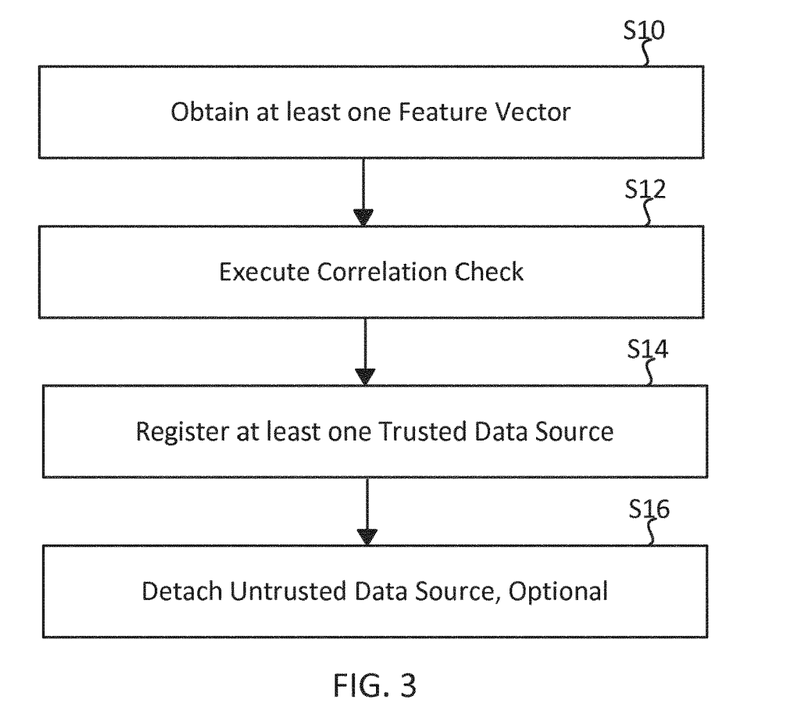
FIG. 3 shows a flowchart of operation for the data source verifying apparatus shown in FIG. 2.

FIG. 3 shows a flowchart of operation for the data source verifying apparatus 12 shown in FIG. 2.

Generally, the data source verifying apparatus 12 according to the present invention executes a method of verifying at least one data source 14-1, . . . , 14-n that generates new specimen data intended for use in a machine learning infrastructure.

As shown in FIG. 3, the method of verifying at least one data source 14-1, . . . , 14-n comprises a step S10, operatively being executed by the obtaining unit 22, of obtaining at least one feature vector representing the new specimen data at a data source verifying apparatus 12.

As outlined above, the at least one feature vector may be the output of a Siamese network processing input source data, represent image data being compressed by filter and polling layers of the Siamese network for generation of the input source data, and may be encrypted and/or compressed prior to transmission.

As shown in FIG. 3, the method of verifying at least one data source 14-1, . . . , 14-n further comprises a step S12, operatively being executed by the correlation checking unit 24, of executing a correlation check between the received at least one feature vector and at least one reference feature vector representing trusted specimen data for determination of a correlation measure. As outlined above, the correlation check may use a similarity/distance check.

As shown in FIG. 3, the method of verifying at least one data source 14-1, . . . , 14-n further comprises a step S14, operatively being executed by the registration unit 26, of registering the at least one data source 14-1, . . . , 14-n as trusted data source at the subscription management apparatus 16 when the correlation measure is below a first predetermined threshold and the new specimen data is different from the trusted specimen data.

As shown in FIG. 3, the method of verifying at least one data source 14-1, . . . , 14-n further comprises an optional step S16, operatively being executed by the optional detaching unit 28, of detaching the at least one data source 14-1, . . . , 14-n from the data source verifying apparatus 12 when the correlation measure is equal to or higher than the predetermined threshold.

Figure 4:
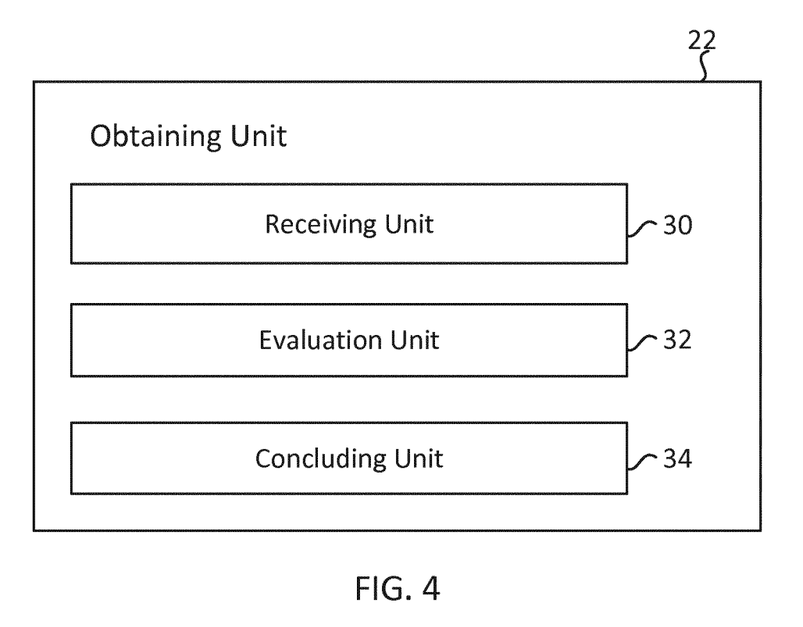
FIG. 4 shows a further detailed schematic diagram of the data source verifying apparatus as shown in FIG. 2.

FIG. 4 shows a further detailed schematic diagram of data source verifying apparatus 12 shown in FIG. 2.

As shown in FIG. 4, the obtaining unit 22 in the data source verifying apparatus comprises a receiving unit 30 adapted to receive a plurality of feature vectors representing the new specimen data as anchor data.

As shown in FIG. 4, the obtaining unit 22 further comprises an evaluation unit 32 adapted to evaluate whether the plurality of feature vectors have a continuous occurrence and a concluding unit 34 adapted to conclude on the new specimen data being related to a new object upon continuous occurrence of the plurality of feature vectors.

Figure 5:
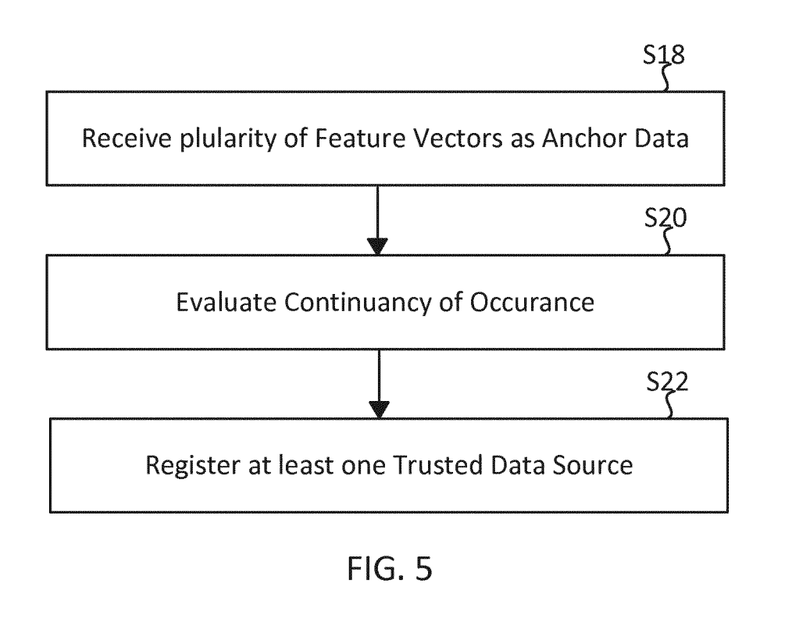
FIG. 5 shows a further detailed flowchart of operation for the data source verifying apparatus shown in FIG. 4.

FIG. 5 shows a further flowchart of operation for the obtaining unit 22 shown in FIG. 4.

As shown in FIG. 5, the step S10 of obtaining the at least one feature vector comprises a step S18, operatively being executed by the receiving unit 30, of receiving a plurality of feature vectors representing the new specimen data as anchor data.

As shown in FIG. 5, the step 10 of obtaining the at least one feature vector further comprises a step S20, operatively being executed by the evaluating unit 32, of evaluating whether the plurality of feature vectors have a continuous occurrence.

As shown in FIG. 5, the step S10 of obtaining the at least one feature vector further comprises a step 22, operatively being executed by the concluding unit 34, of concluding on the new specimen data being related to a new object upon continuous occurrence of the plurality of feature vectors.

In the above different aspects of the present invention in relation to the method of verifying at least one data source and related apparatus have been described. In the following the description will focus on further aspects of the present invention with respect to a method of automatic generation of at least one feature vector and related apparatus.

Figure 6:
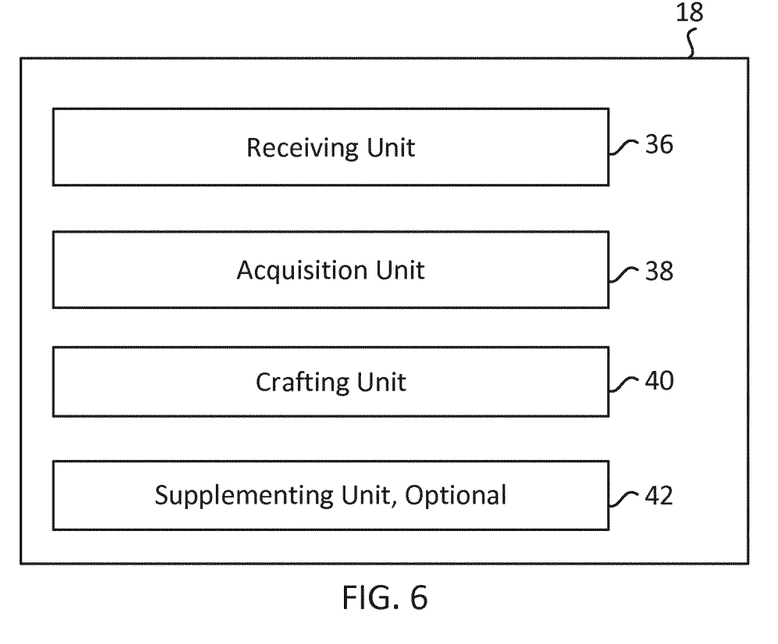
FIG. 6 shows a schematic diagram of a feature vector crafting apparatus for crafting at least one new feature vector from new specimen data according to the present invention.

FIG. 6 shows a schematic diagram of a feature vector crafting apparatus 18 for crafting at least one new feature vector from new specimen data generated by at least one data source 14-1, . . . , 14-n, according to the present invention.

The feature vector crafting apparatus 18 may comprise processing circuitry 54 and a memory 56 containing instructions executable by the processing circuitry 54 to implement the functionality to be described in the following.

Generally, the feature vector crafting apparatus 18 supports identification of unknown features in data like images and creation of related new feature vectors for subsequent use in the machine learning infrastructure 20.

As shown in FIG. 6, the feature vector crafting apparatus 18 for crafting at least one new feature vector comprises a receiving unit 36 adapted to receive an identification of at least one trusted data source 14-1, . . . , 14-n at the feature vector crafting apparatus 18.

As shown in FIG. 6, the feature vector crafting apparatus 18 further comprises an acquisition unit 38 adapted to acquire at least one saliency map in relation to new specimen data generated at the at least one trusted data source.

Here, the at least one saliency map indicates which part of the new specimen data is to be used for obtaining at least one new feature. The saliency map is used as indicator for feature generation. The saliency map is computed for an input image based on common-structure analysis in a given dataset of images to identify new features in an image. The saliency map will automatically highlight the region detected new object part and ignore background and other objects that are not relevant for this dataset.

Further, preferably the acquisition unit 38 is adapted to acquire the at least one saliency map by querying the at least one trusted data source 14-1, . . . , 14-n for transfer of the at least one saliency map in relation new specimen data.

Alternatively, the acquisition unit 38 is adapted to acquire the at least one saliency map by local generation of the at least one saliency map from input data transferred by the at least one trusted data source to the feature vector crafting apparatus 18.

It should be noted that according to the present invention the acquisition unit 38 may also be adapted to acquire the at least one saliency map through a combination querying and local generation of saliency maps.

As shown in FIG. 6, the feature vector crafting apparatus further comprises a crafting unit 40 adapted to craft the at least one new feature vector from the part of new specimen data identified by the at least one saliency map.

As shown in FIG. 6, the feature vector crafting apparatus 18 optionally comprises a supplementing unit 42 adapted to add the most uncorrelated feature area to the machine learning model. Preferably, the machine learning model is a boosted machine learning model.

Figure 7:
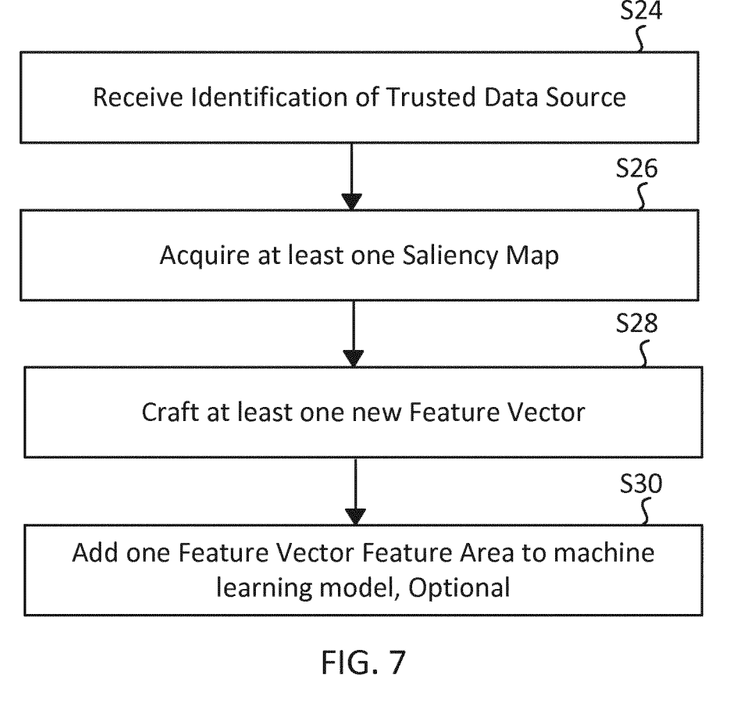
FIG. 7 shows a flowchart of operation for the feature vector crafting apparatus shown in FIG. 6.

FIG. 7 shows a flowchart of operation for the feature vector crafting apparatus 18 shown in FIG. 6;

As shown in FIG. 7, the method of crafting at least one new feature vector from new specimen data generated by at least one data source comprises a step S24, operatively being executed by the receiving unit 36, of receiving an identification of at least one trusted data source at a feature vector crafting apparatus 18.

As shown in FIG. 7, the method of crafting at least one new feature vector comprises a step S26, operatively being executed by the acquisition unit 38, of acquiring at least one saliency map in relation to new specimen data generated at the at least one trusted data source, wherein the at least one saliency map indicates which part of the new specimen data is to be used for obtaining at least one new feature.

As outlined above, according to the present invention the acquiring of the at least one saliency map is executed by querying the at least one trusted data source 14-1, . . . , 14-n for transfer of the at least one saliency map in relation new specimen data, by local generation of the at least one saliency map from input data transferred by the at least one trusted data source 14-1, . . . , 14-n to the feature vector crafting apparatus 18, and/or by a combination of both approaches.

As shown in FIG. 7, the method of crafting at least one new feature vector comprises a step S28, operatively being executed by the crafting unit 40, of crafting the at least one new feature vector from the part of new specimen data identified by the at least one saliency map.

As shown in FIG. 7, the method of crafting at least one new feature vector comprises a step S30, operatively being executed by the supplementing unit 42, of adding the most uncorrelated feature area and related new feature vector to the machine learning model, preferably a boosted machine learning model.

Figure 8:
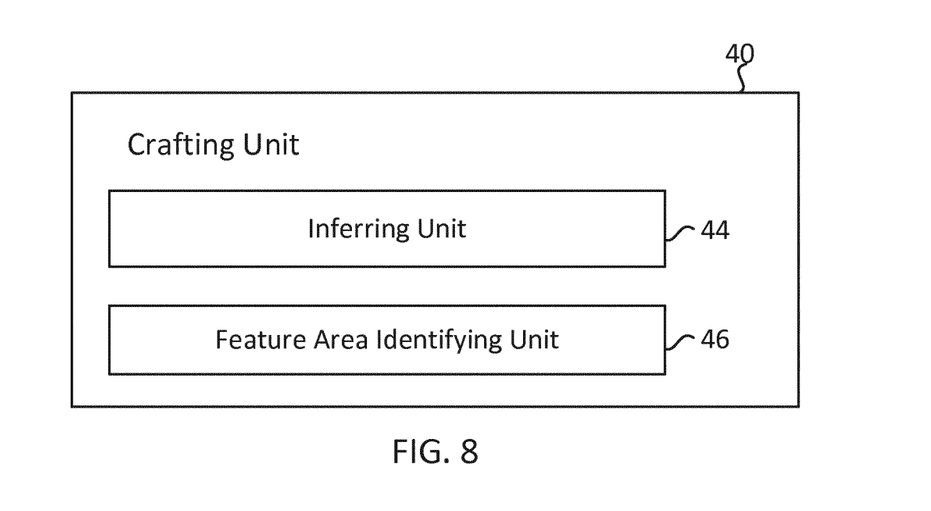
FIG. 8 shows a further detailed schematic diagram of the feature vector crafting apparatus shown in FIG. 7.

FIG. 8 shows a further detailed schematic diagram of the crafting unit 40 shown in FIG. 6.

As shown in FIG. 8, the crafting unit 40 of the feature vector crafting apparatus 18 comprises an inferring unit 44 adapted to infer at least one feature area in relation to background for the new specimen data.

As shown in FIG. 8, the crafting unit 40 of the feature vector crafting apparatus 18 further comprises a feature area identifying unit 46 adapted to execute a correlation check between at least one feature area in the new specimen data and existing features maintained in a machine learning model and adapted to identify a most uncorrelated feature area in the new specimen data with respect to existing features.

Figure 9:
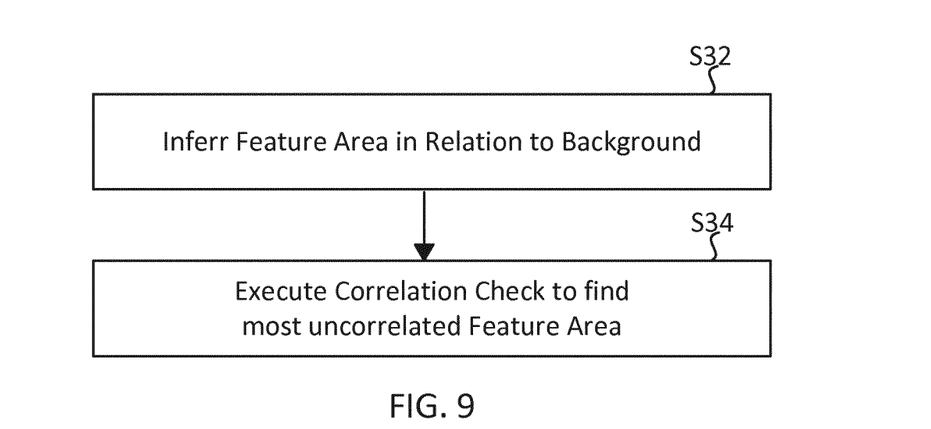
FIG. 9 shows a further detailed flowchart of operation for the feature vector crafting apparatus shown in FIG. 8.

FIG. 9 shows a further detailed flowchart of operation for the crafting unit 40 shown in FIG. 8.

As shown in FIG. 9, the step S28 of crafting the at least one new feature vector comprises a step S32, operatively being executed by the inferring unit 44, of inferring at least one feature area in relation to background for the new specimen data.

As shown in FIG. 9, the step S28 of crafting the at least one new feature vector further comprises a step S34, operatively being executed by the feature area identifying unit 46, of executing a correlation check between at least one feature area in the new specimen data and existing features maintained in a machine learning model to identify a most uncorrelated feature area in the new specimen data with respect to existing features.

Further to the above, the present invention also relates computer program product 50a comprising a computer readable medium, the computer readable medium having computer readable code embodied therein, the computer readable code being configured such that, on execution by a suitable computer or processor 48, the computer or processor is caused to perform a method of verifying at least one data source that generates new specimen data intended for use in a machine learning infrastructure as explained above.

Further to the above, the present invention also relates to a computer program product 56a comprising a computer readable medium, the computer readable medium having computer readable code embodied therein, the computer readable code being configured such that, on execution by a suitable computer or processor 54, the computer or processor is caused to perform a method of crafting at least one new feature vector from new specimen data generated by at least one data source as explained above.

Figure 10:
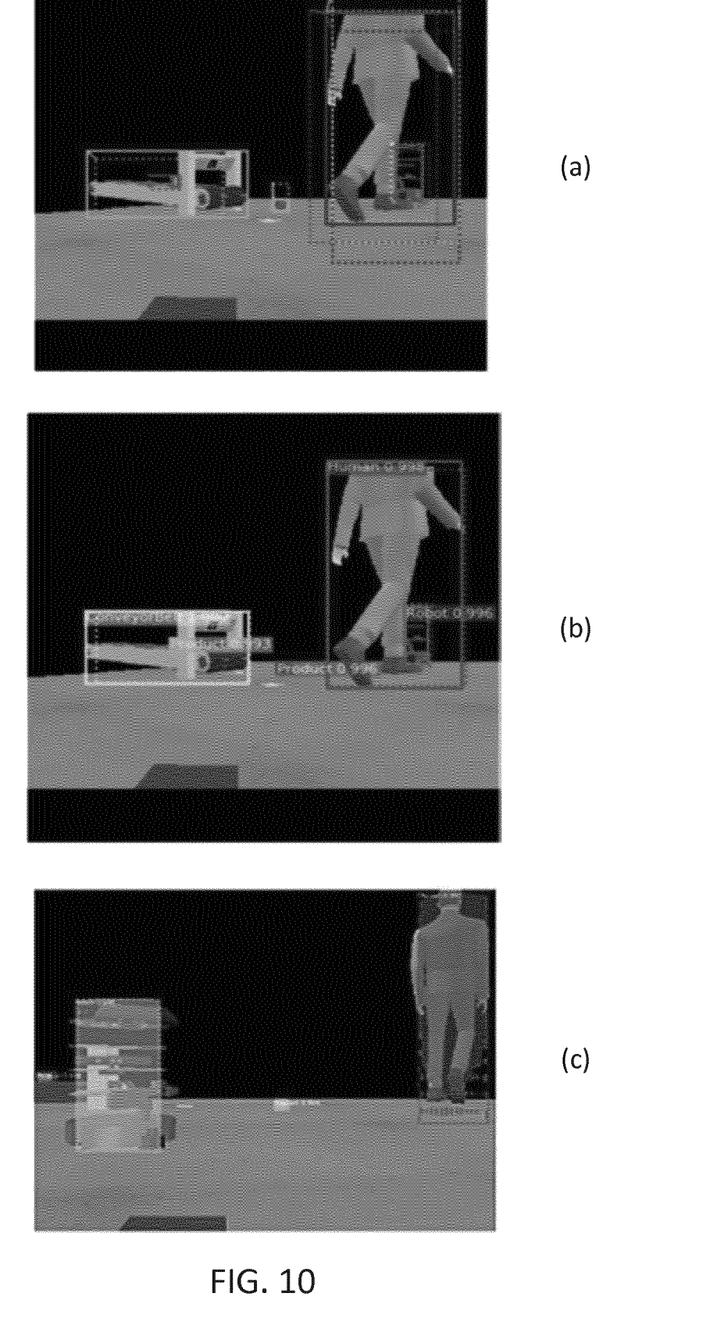
FIG. 10 shows a first example of feature vector crafting according to the present invention.

FIG. 10 shows a first example of feature vector crafting according to the present invention.

The first example relates to identification of a new type of robot/moving device by another robot using its camera or lidar sensor in smart factory, logistics or applicable to multiple other domains. This solution may be used in future smart factories using Autonomous Grounded Vehicles AGV, robots or any other autonomous devices having the need to continuously monitor the devices.

According to the present invention the robot perception algorithm is trained to identify and label the objects, e.g., according to FIG. 10(*a*) the algorithm first identifies different objects in the scene using bounding boxes and according to and FIG. 10(*b*) then labels those identified objects.

However, new objects can appear in the environment like a new moving robot different than the previous one that was identified, e.g., a robot as shown in FIG. 10(*c*). Then the algorithm according to the present invention will identify the object as a new object and assign a label to it for subsequent handling thereof.

Figure 11:
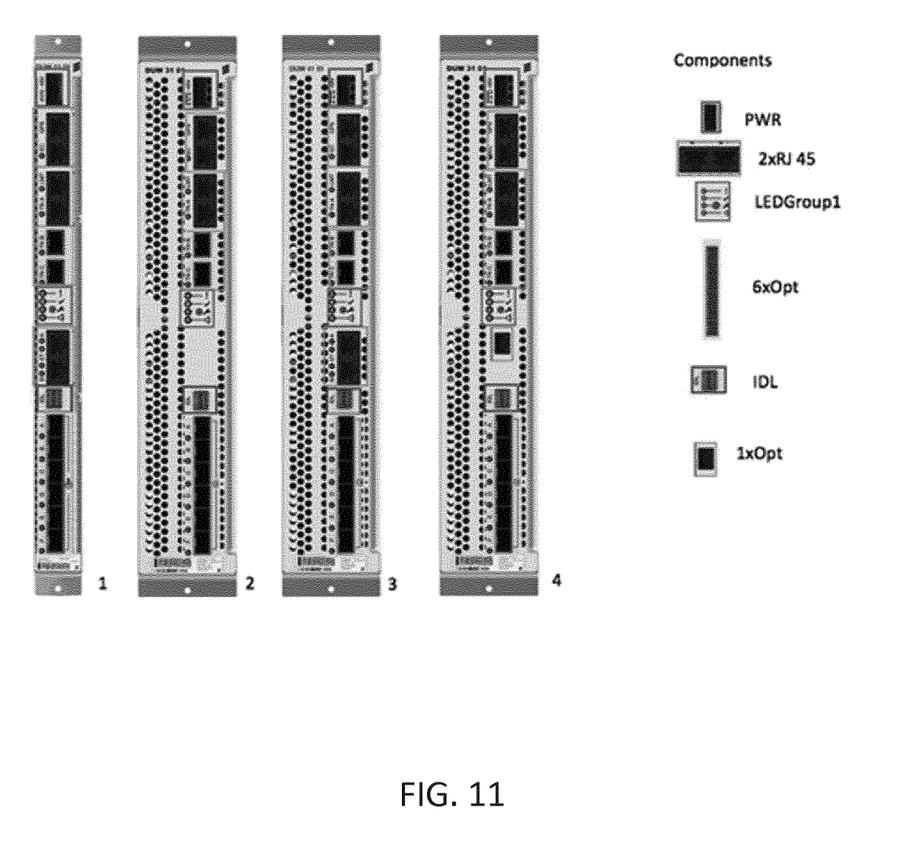
FIG. 11 shows a second example of feature vector crafting according to the present invention.

FIG. 11 shows a second example of feature vector crafting according to the present invention.

When a new product is added new features like cooling holes or new component elements etc. may be introduced. For example, if the old model considered only 2RJ45_nr as the number of 2RJ45 ports as features for board-1 and board-2, it cannot distinguish board-3 and board-4 as board-3 has the same 2RJ45_nr as board-1 and board-4 has the same 2RJ45_nr as board-4. Thus, there is a need to add new features such as board width, 1OPT_nr etc.

According to the present invention this procedure is executed in an automatic manner. Optionally, when the auto feature generation introduces more extra features than necessary then it may optionally use an automated feature selection.

Figure 12:
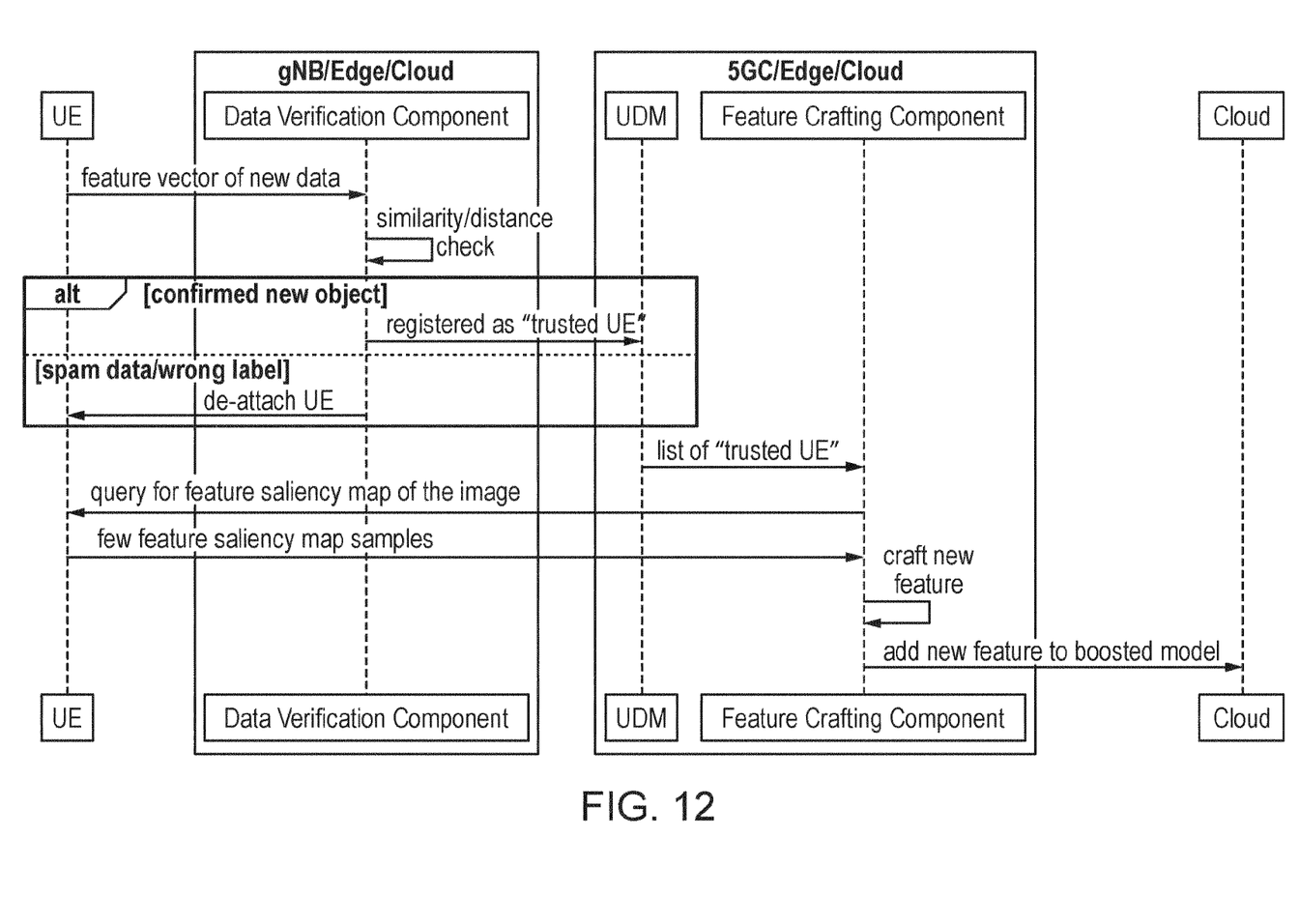
FIG. 12 shows an example of integration of the method of verifying at least one data source and the method of crafting at least one new feature vector on a system level.

FIG. 12 shows an example of integration of the method of verifying at least one data source and the method of crafting at least one new feature vector on a system level.

According to the example shown in FIG. 12 the data sources 14-1, . . . , **14-*n* are user terminals UE, the data source verifying apparatus 12 is a data verification component of a 5G Core base station gNB, in an edge zone of a cloud, or in the cloud itself, the subscription management apparatus 16 is a user data management unit in 5G core network, in an edge zone of a cloud, or in the cloud itself, and the feature vector crafting apparatus 18** is a feature crafting component of the 5G core network.

The UE shown in FIG. 12 may have installed a Siamese network as one type of neural network allowing one-shot learning. The UE will send a feature vector processed after processing in convolutional networks instead of the whole picture. Here, the data pipeline may be secured for transfer data from the from UE, by, e.g. using public key encryption.

If the data is maliciously modified the related feature vector will be totally out of similarity. If the data is genuine the feature vector will show expected small difference for new object and almost no difference for existing objects.

It provides advantage in transmission: more secure, less data to send/less throughput requirement.

As shown in FIG. 12, when a potential new object is found, the new image/data will be sent to the Cloud/Core. First several new object images will be saved as anchor data. If the same new objects continuously occur, then the feature crafting component in the cloud/core concludes there is a new object. The comparison is done via Siamese Network working like a fingerprint similarity check.

Further, when new products occur feature crafting component generates feature vectors automatically. Then machine learning algorithms selects and adds features.

As shown in FIG. 12, after processing data trustworthiness there may occur a core/cloud query for few samples of feature saliency maps from the user terminal UE who found new object according to the feature vector they submitted in the process of establishing data trustworthiness. Then, the core finds a new feature area and crafts new feature vectors the existing machine learning model. It is usually a boosted machine learning model so that there is no need for re-training.

A first assumption for the example shown in FIG. 12 may be the image/data is well-formatted so that no format-cleaning is needed. A second assumption may be that data does not require fast real-time calculation so that building new machine learning models is possible given minutes of time.

Main components for the example shown in FIG. 12 are as follows:

Data verification component DVC. This is used to validate the sanity of the new data before adding the data and UE into the databases. This performs a similarity/distance check. Based on the result, the trusted data and UE will be added to the databases, otherwise rejected. This component may reside on the gNB/eNB or at the edge.

Feature crafting component FCC. This is used to automatically generate newly identified feature vectors based on the saliency map. This component may reside on 5GCore or in the edge/cloud that is close to the database.

For the workflow described in FIG. 12 a user terminal UE may run a labeling tool, a real time camera, or a sensor feeding data by time series. The user terminal UE may feed the feature vector as the output of the Siamese network after inputting the data to the Siamese network. After processing of the input date with the neural network the information in feature vector is encrypted and compressed making it hardly possible to crack and decode data during transmission.

Moreover, image data will shrink after filter and polling layers in Siamese net. Thus, excessive traffic can be avoided in verifying the data source.

As shown in FIG. 12, the base station gNB/network edge will take over the feature vector and perform a correlation check with the historical trusted data and/or related feature vectors. If the likelihood of the two data is below a threshold, yet not completely same as the ground truth the data verification component determines that the data is not irrelevant or wrongly labeled but is a new feature. The submitting user terminal UE is recorded as "trusted UE" in user data management UDM of the 5G core. Else, the data from "Non-trusted" UE is abandoned and the device is de-attached.

As shown in FIG. 12, the list of "Trusted UE" is fed into feature crafting component FCC, e.g., from the subscription management in UDM. According to specific use case and implementation, the feature crafting component FCC could either request user terminal UE to send the saliency map of the input data or process the input data to acquire saliency map on the feature crafting component FCC locally.

Further, based on the saliency map, feature crafting component FCC could inference the "likely featured area" out of the background. Feature crafting component FCC will perform another correlation check and figure out "the most uncorrelated feature area" with the historical hand-crafted features in the present boosting model. The related feature vector may then be added to the boosting machine learning model to identify the new object with the new feature vector.

Figure 13:
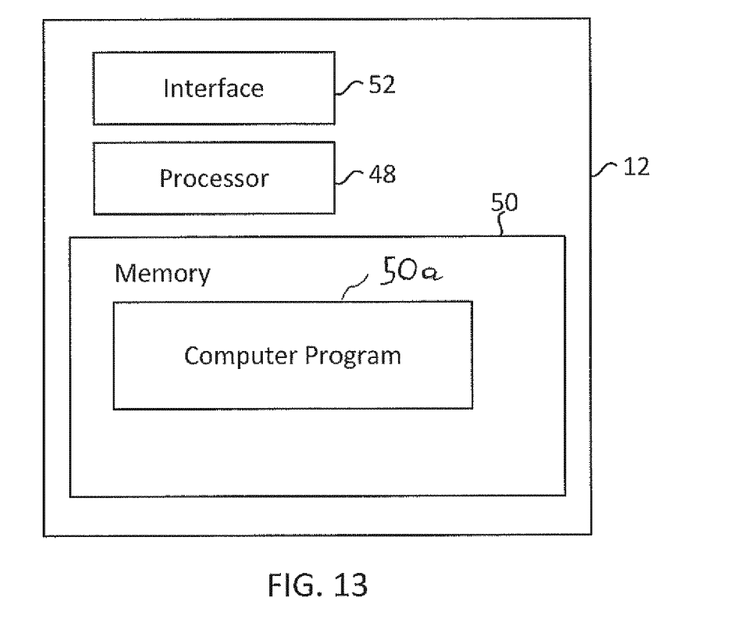
FIG. 13 shows a schematic diagram of a memory/processing circuitry structure of the data source verifying apparatus according to the present invention.

FIG. 13 shows a schematic diagram of a memory/processing circuitry structure of the data source verifying apparatus according to the present invention.

As shown, in FIG. 13 the data source verifying apparatus 12 for verifying at least one data source that generates new specimen data intended for use in a machine learning infrastructure comprises processing circuitry 48 and a memory 50. Also, the data source verifying apparatus may comprise an interface 52.

Operatively, the memory 50 contains instructions executable by the processing circuitry, whereby the data source verifying apparatus 12 is operable to obtain at least one feature vector representing the new specimen data at the data source verification apparatus, execute a correlation check between the received at least one feature vector and at least one reference feature vector representing trusted specimen data for determination of a correlation measure; and to register the at least one data source as trusted data source at a subscription management apparatus when the correlation measure is below a first predetermined threshold and the new specimen data is different from the trusted specimen data.

Figure 14:
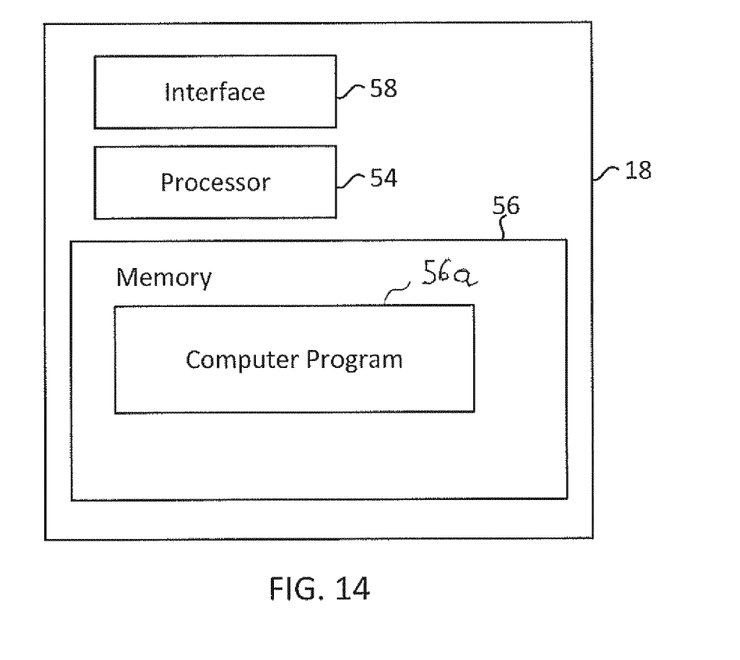
FIG. 14 shows a schematic diagram of a memory/processing circuitry structure of the feature vector crafting apparatus according to the present invention.

FIG. 14 shows a schematic diagram of a memory/processing circuitry structure of the feature vector crafting apparatus 18 according to the present invention.

As shown in FIG. 14, the feature vector crafting apparatus 18 is for crafting at least one new feature vector from new specimen data generated by at least one data source and comprises a processing circuitry 54 and a memory 56. Also, the data source verifying apparatus may comprises an interface 58.

Operatively, the memory 56 contains instructions executable by the processing circuitry 54 whereby the feature vector crafting apparatus is operable to receive an identification of at least one trusted data source at a feature vector crafting apparatus, acquire at least one saliency map in relation to new specimen data generated at the at least one trusted data source, wherein the at least one saliency map indicates which part of the new specimen data is to be used for obtaining at least one new feature, and to draft the at least one new feature vector from the part of new specimen data identified by the at least one saliency map.

As explained above, the present invention provides a solution to add the new feature vectors to a machine learning model in an automatic manner. A first part of the inventive solution is related to data trustworthiness and to ensure that data is correct/genuine and a second part of the present invention is related to automatic creation of new feature vectors.

The invention claimed is:

1. A method of verifying at least one data source that generates new specimen data intended for use in a machine learning infrastructure, the method comprising:
    obtaining at least one feature vector representing the new specimen data at a data source verifying apparatus;
    executing a correlation check between the at least one feature vector and at least one reference feature vector representing trusted specimen data for determination of a correlation measure; and
    registering the at least one data source as at least one trusted data source at a subscription management apparatus when the correlation measure is below a first predetermined threshold and the new specimen data is different from the trusted specimen data.

2. A data source verifying apparatus for verifying at least one data source that generates new specimen data intended for use in a machine learning infrastructure, the data source verifying apparatus comprising processing circuitry and a memory containing instructions executable by the processing circuitry whereby the data source verifying apparatus is configured to:
    obtain at least one feature vector representing the new specimen data at the data source verification apparatus;
    execute a correlation check between the at least one feature vector and at least one reference feature vector representing trusted specimen data for determination of a correlation measure; and to
    register the at least one data source as trusted data source at a subscription management apparatus when the correlation measure is below a first predetermined threshold and the new specimen data is different from the trusted specimen data.

3. The data source verifying apparatus according to claim 2, the memory containing instructions executable by the processing circuitry whereby the data source verifying apparatus is configured to:
    receive a plurality of feature vectors representing the new specimen data as anchor data;
    evaluate whether the plurality of feature vectors have a continuous occurrence; and
    conclude on the new specimen data being related to a new object upon continuous occurrence of the plurality of feature vectors.

4. The data source verifying apparatus according to claim 2, the memory containing instructions executable by the processing circuitry whereby the data source verifying apparatus is configured to execute a similarity/distance check.

5. The data source verifying apparatus according to claim 2, the memory containing instructions executable by the processing circuitry whereby the data source verifying apparatus is configured to detach the at least one data source from the data source verifying apparatus when the correlation measure is equal to or higher than the predetermined threshold.

6. The data source verifying apparatus according to claim 2, the memory containing instructions executable by the processing circuitry whereby the data source verifying apparatus is configured to obtain the at least one feature vector as output of a Siamese network processing input source data.

7. The data source verifying apparatus according to claim 6, the memory containing instructions executable by the processing circuitry whereby the data source verifying apparatus is configured to compress image data by filter and polling layers of the Siamese network for generation of the input source data.

8. The data source verifying apparatus according to claim 2, the memory containing instructions executable by the processing circuitry whereby the data source verifying apparatus is configured to obtain at least one feature vector which is encrypted and/or compressed.

9. A feature vector crafting apparatus comprising processing circuitry and a memory containing instructions executable by the processing circuitry whereby the feature vector crafting apparatus is configured to:
   receive an identification of at least one trusted data source at the feature vector crafting apparatus;
   acquire at least one saliency map in relation to new specimen data generated at the at least one trusted data source, wherein the at least one saliency map indicates which part of the new specimen data is to be used for obtaining at least one new feature vector; and
   craft the at least one new feature vector from the part of new specimen data identified by the at least one saliency map.

10. The feature vector crafting apparatus according to claim 9, the memory containing instructions executable by the processing circuitry whereby the feature vector crafting apparatus is configured to acquire the at least one saliency map by querying the at least one trusted data source for transfer of the at least one saliency map in relation new specimen data.

11. The feature vector crafting apparatus according to claim 9, the memory containing instructions executable by the processing circuitry whereby the feature vector crafting apparatus is configured to acquire the at least one saliency map by local generation of the at least one saliency map from input data transferred by the at least one trusted data source to the feature vector crafting apparatus.

12. The feature vector crafting apparatus according to claim 9, the memory containing instructions executable by the processing circuitry whereby the feature vector crafting apparatus is configured to infer at least one feature area in relation to background for the new specimen data.

13. The feature vector crafting apparatus according to claim 9, the memory containing instructions executable by the processing circuitry whereby the feature vector crafting apparatus is configured to execute a correlation check between at least one feature area in the new specimen data and existing features maintained in a machine learning model and to identify a most uncorrelated feature area in the new specimen data with respect to existing features.

14. The feature vector crafting apparatus according to claim 13, wherein the machine learning model is a boosted machine learning model.

15. A system for automatic generation of at least one feature vector for use in a machine learning infrastructure, the system comprising:
   a data source verifying apparatus for verifying at least one data source that generates new specimen data, wherein the data source verifying apparatus comprises processing circuitry configured to:
      obtain at least one feature vector representing the new specimen data;
      execute a correlation check between the at least one obtained feature vector and at least one reference feature vector representing trusted specimen data for determination of a correlation measure; and
      register the at least one data source as at least one trusted data source at a subscription management apparatus when the correlation measure is below a first predetermined threshold and the new specimen data is different from the trusted specimen data; and
   a feature vector crafting apparatus that comprises processing circuitry configured to:
      receive an identification of the at least one trusted data source;
      acquire at least one saliency map in relation to the new specimen data generated at the at least one trusted data source, wherein the at least one saliency map indicates which part of the new specimen data is to be used for obtaining at least one new feature vector; and
      craft the at least one new feature vector from the part of new specimen data identified by the at least one saliency map.

16. The system according to claim 15, wherein the data source verifying apparatus comprises processing circuitry configured to:
   receive a plurality of feature vectors representing the new specimen data as anchor data;
   evaluate whether the plurality of feature vectors have a continuous occurrence; and
   conclude on the new specimen data being related to a new object upon continuous occurrence of the plurality of feature vectors.

17. The system according to claim 15, wherein the data source verifying apparatus comprises processing circuitry configured to execute a similarity/distance check.

18. The system according to claim 15, wherein the data source verifying apparatus comprises processing circuitry configured to detach the at least one data source from the data source verifying apparatus when the correlation measure is equal to or higher than the predetermined threshold.

19. The system according to claim 15, wherein the data source verifying apparatus comprises processing circuitry configured to obtain the at least one feature vector as output of a Siamese network processing input source data.

20. The system according to claim 19, wherein the data source verifying apparatus comprises processing circuitry configured to compress image data by filter and polling layers of the Siamese network for generation of the input source data.

* * * * *